US009843893B2

(12) United States Patent
Haro et al.

(10) Patent No.: US 9,843,893 B2
(45) Date of Patent: Dec. 12, 2017

(54) METHOD AND APPARATUS FOR PROVIDING POINT-OF-INTEREST DETECTION VIA FEATURE ANALYSIS AND MOBILE DEVICE POSITION INFORMATION

(71) Applicant: HERE Global B.V., Veldhoven (NL)

(72) Inventors: Antonio Haro, Hercules, CA (US); Jeffrey Adachi, El Cerrito, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/481,258

(22) Filed: Sep. 9, 2014

(65) Prior Publication Data

US 2016/0073229 A1    Mar. 10, 2016

(51) Int. Cl.
*H04W 24/00* (2009.01)
*H04W 4/02* (2009.01)

(52) U.S. Cl.
CPC ........... *H04W 4/021* (2013.01); *H04W 4/028* (2013.01)

(58) Field of Classification Search
CPC .............................. H04W 4/021; H04W 4/028
USPC .......................................... 455/456; 370/338
See application file for complete search history.

(56) References Cited

U.S. PATENT DOCUMENTS

| | | | | |
|---|---|---|---|---|
| 2012/0274625 A1* | 11/2012 | Lynch | ...................... | G06T 17/05 345/419 |
| 2012/0310516 A1* | 12/2012 | Zeng | ...................... | G01C 21/32 701/300 |
| 2013/0090133 A1* | 4/2013 | D'Jesus Bencci | .... | H04W 4/028 455/456.2 |
| 2015/0172860 A1* | 6/2015 | Rosenstock | ........... | H04W 4/028 455/456.3 |
| 2015/0319568 A1* | 11/2015 | Haro | ..................... | H04W 4/021 455/456.1 |

(Continued)

FOREIGN PATENT DOCUMENTS

WO    2014/043764 A1    3/2014

OTHER PUBLICATIONS

Chehata et al., "Airborne LiDAR Feature Selection for Urban Classification Using Random Forests", IAPRS, vol. XXXVIII, Part 3/W8—Paris, France, Sep. 1-2, 2009, pp. 207-212.

(Continued)

*Primary Examiner* — Marcos Batista
(74) *Attorney, Agent, or Firm* — Ditthavong & Steiner, P.C.

(57) ABSTRACT

An approach is provided for determining new point(s)-of-interest based, at least in part, on mobile device positioning, three dimensional location data, or a combination thereof. The approach involves processing and/or facilitating a processing of location information associated with a plurality of devices to determine one or more location points at which there are one or more concentrations of the plurality of devices. The approach also involves causing, at least in part, an accessing of three-dimensional data representing the one or more location points. The approach further involves processing and/or facilitating a processing of the three-dimensional data to determine one or more features that are indicative of a presence of one or more points of interest. The approach also involves determining one or more candidate points of interest based, at least in part, on the one or more features.

20 Claims, 12 Drawing Sheets

(56) References Cited

U.S. PATENT DOCUMENTS

2015/0362988 A1* 12/2015 Yamamoto .............. G06F 3/011
345/156

OTHER PUBLICATIONS

Kwak, "Automatic 3D Building Model Generation by Integrating LiDAR and Aerial Images Using a Hybrid Approach", Department of Geomatics Engineering, UCGE Reports No. 20374, Jan. 2013, 180 pages, URL: http://www.geomatics.ucalgary.ca/graduatetheses.
Wang et al., "Window Detection from Mobile LiDAR Data", 2011 IEEE Workshop on Applications of Computer Vision (WACV), Jan. 2011, 8 pages.
Antonarakis et al., "Object-based land cover classification using airborne LiDAR", Remote Sensing of Environment, vol. 112, Issue 6, Jun. 16, 2008, pp. 2988-2998.

* cited by examiner

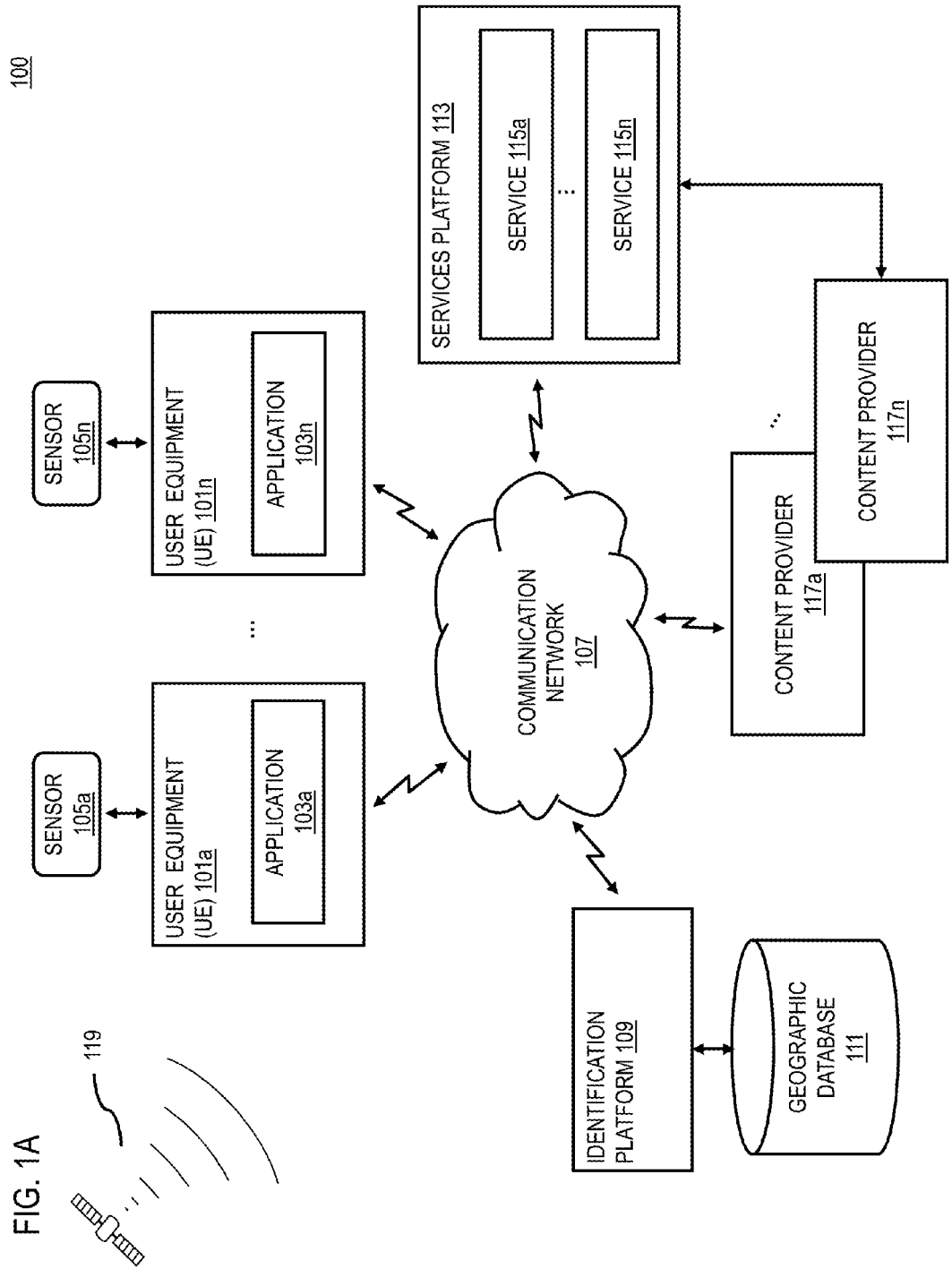

METHOD AND APPARATUS FOR PROVIDING POINT-OF-INTEREST DETECTION VIA FEATURE ANALYSIS AND MOBILE DEVICE POSITION INFORMATION

BACKGROUND

Service providers and device manufacturers (e.g., wireless, cellular, etc.) are continually challenged to deliver value and convenience to consumers by, for example, providing accurate point(s)-of-interest (POI) to the users of the mobile devices during their travel. One area of interest has been in collecting and processing location information for guiding users to their desired destinations. Since location information is constantly changing, the location database needs to be updated in real-time to reflect the changes. However, the traditional method of monitoring the changes in location information is inefficient, for example, new POIs are manually detected and entered in the location database. Such manual determination of new POI may be incorrect, and may influence the accuracy of the collected location data. Needless to mention, location inaccuracies are unacceptable while assisting users in making an informed decision regarding their travel. As a result, service providers face significant technical challenges in providing correct POI information that instantaneously reflects any changes in the location information.

SOME EXAMPLE EMBODIMENTS

Therefore, there is a need for an approach for detecting POIs using a combination of mobile device positioning with three dimensional location data.

According to one embodiment, a method comprises processing and/or facilitating a processing of location information associated with a plurality of devices to determine one or more location points at which there are one or more concentrations of the plurality of devices. The method also comprises causing, at least in part, an accessing of three-dimensional data representing the one or more location points. The method further comprises processing and/or facilitating a processing of the three-dimensional data to determine one or more features that are indicative of a presence of one or more points of interest. The method also comprises determining one or more candidate points of interest based, at least in part, on the one or more features.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of location information associated with a plurality of devices to determine one or more location points at which there are one or more concentrations of the plurality of devices. The apparatus is also caused to cause, at least in part, an accessing of three-dimensional data representing the one or more location points. The apparatus is further caused to process and/or facilitate a processing of the three-dimensional data to determine one or more features that are indicative of a presence of one or more points of interest. The apparatus is also caused to determine one or more candidate points of interest based, at least in part, on the one or more features.

According to another embodiment, a computer-readable storage medium carries one or more sequences of one or more instructions which, when executed by one or more processors, cause, at least in part, an apparatus to process and/or facilitate a processing of location information associated with a plurality of devices to determine one or more location points at which there are one or more concentrations of the plurality of devices. The apparatus is also caused to cause, at least in part, an accessing of three-dimensional data representing the one or more location points. The apparatus is further caused to process and/or facilitate a processing of the three-dimensional data to determine one or more features that are indicative of a presence of one or more points of interest. The apparatus is also caused to determine one or more candidate points of interest based, at least in part, on the one or more features.

According to another embodiment, an apparatus comprises means for processing and/or facilitating a processing of location information associated with a plurality of devices to determine one or more location points at which there are one or more concentrations of the plurality of devices. The apparatus also comprises means for causing, at least in part, an accessing of three-dimensional data representing the one or more location points. The apparatus further comprises means for processing and/or facilitating a processing of the three-dimensional data to determine one or more features that are indicative of a presence of one or more points of interest. The apparatus also comprises means for determining one or more candidate points of interest based, at least in part, on the one or more features.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of detecting POIs using a combination of mobile device positioning with three dimensional location data, according to one embodiment;

DESCRIPTION OF SOME EMBODIMENTS

Figure 1B:
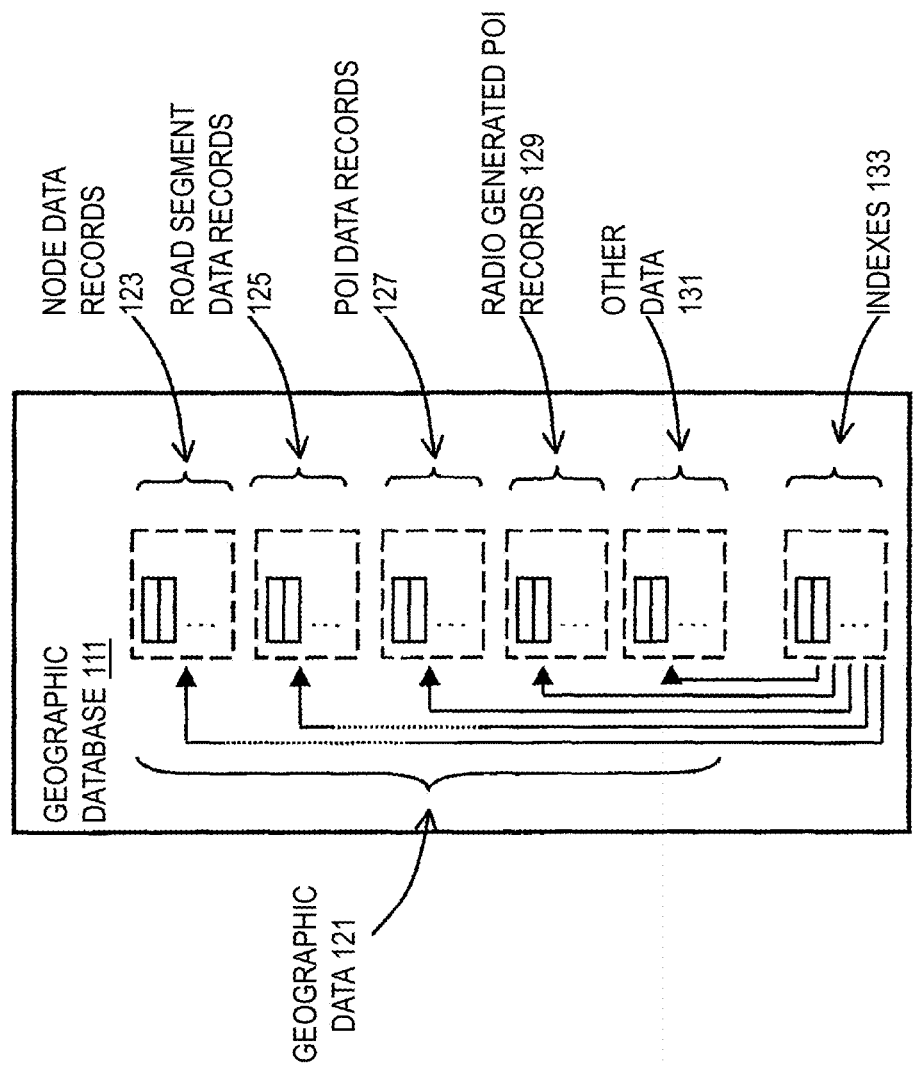
FIG. 1B is a diagram of the geographic database 111 of system 100, according to exemplary embodiments.

Examples of a method, apparatus, and computer program for detecting point(s)-of-interest (POI) using a combination of mobile device positioning with three dimensional location data, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to detecting new POIs via mobile device positioning and three dimensional location data, it is contemplated that the approach described herein may be applicable to any invention that can be modelled according the example processes described below and can benefit from detecting new POIs via mobile device positioning and three dimensional location data.

FIG. 1A is a diagram of a system capable of detecting POI using a combination of mobile device positioning with three dimensional location data, according to one embodiment. As previously discussed, one area of interest among service providers and device manufacturers has been accurate and efficient collection and processing of location information for determining new POIs so various location-based services, for example navigation assistance, may be provided to users to improve the quality of their travels. However, the ability to determine and constantly maintain real-time location information is still not available. Furthermore, the manual intervention to review the existence of POI increases the probability of false positives. Of course, the changes in location conditions happen too quickly to rely on old information.

To solve this problem, system 100 utilizes mobile devices emitting location information to identify geographical regions with large numbers of unique stationary users. Then, the system 100 collects LIDAR data at the identified geographical region. Subsequently, the system 100 processes the LIDAR data to find features that may indicate the presence of a new POI. In one scenario, the LIDAR sensor uses one or more lasers to collect data points representing a surrounding area (e.g., POI). The LIDAR sensor may collect LIDAR data by emitting laser from an instrument typically mounted on the ground or in an aircraft. The LIDAR detection unit typically is situated in the same instrument as the emitter. The LIDAR unit transmits and detects laser pulses which are reflected off objects on the ground (e.g., soil, rocks, trees, vehicles, buildings, etc.) or in the air. The LIDAR unit measures the time, direction and strength of each reflected laser pulse and the position, velocity and orientation of any transporting vehicle are calculated to determine the geographical position of the reflected laser pulse. In one embodiment, the system 100 may determine one or more locations with strong POI indicating LIDAR features and many unique stationary users as POI candidates. In one scenario, at least one feature may include but not limited to confidence measurement indicating the presence of an awning over an entrance. In such manner, the POIs can be detected and added to the location databases much quicker. Further, the verification process of the detected POIs is faster since verification is simpler than having field workers driving around looking for POIs and subsequently manually entering all data in a database.

In one embodiment, the system 100 may collect LIDAR data, whereupon the LIDAR data is registered and geo-indexed for subsequent processing. In another embodiment, the system 100 may analyze mobile device position data (i.e. probe data) to determine areas where unique mobile devices remained stationary. On the other hand, the probe data may be used to determine the reappearance of one or more mobile devices to a particular location for periods of time relevant to any general functional purposes, for example, eating a meal, withdrawing cash from an ATM machine, reading, etc. These locations may be identified as "significant location points."

In one embodiment, the system 100 may collect a list of geographic positions comprising of significant location points. Then, the system 100 may access corresponding LIDAR data in the same geographical area for each significant location points. Subsequently, the system 100 may process the LIDAR data in the geographic area to compute features using techniques involving but not limited to geometric measures and machine learning. In one scenario, the processing yields a set of confidence measures relevant to POI presence as per the LIDAR data. These measures and confidence measurements may include but are not limited to detecting entrance awnings.

In one scenario, various methods may be implemented to gather information from the real world with x, y, and z coordinates, to generate three-dimensional location data. In one example embodiment, the process of photogrammetry (an image based approach) may be implemented to create three-dimensional model of the real-world objects. The process involves measuring the images for recovering the exact position of the surface points. For example, various cameras may be used to take photographs from different lines of sight of objects, e.g., buildings. These lines of sight are mathematically intersected to produce the three-dimensional coordinates of the POI. The photographic images are the result of a perspective projection of a three dimensional object onto two dimensions. The, one or more photographic images can be reverse engineered to derive the three-dimensional shape of the original object. In another example embodiment, the structured light 3D scanners may be employed to project a single line or a pattern of light onto an object. Then, various cameras, sensors and software may be used to measure how that light is distorted, which can then be used to create a three dimensional point cloud. In a further embodiment, a three dimensional mobile mapping may be applied to extract the geometrical and three dimensional topological vector data from architectural images of various structures. Then, the three dimensional mobile mapping may perform network analysis and simulations to generate three dimension visualizations.

In one embodiment, the system 100 may collect the significant location points with strong POI indicating LIDAR features into a candidate POI list for additional processing and validation. The system 100 may filter the POI candidate list to only include POIs that are missing from an existing POI list, such as a database.

The system 100 comprises of a UE 101a-101n (hereinafter UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

The system 100 comprises of applications 103a-103n (hereinafter applications 103). By way of example, the applications 103 may be any type of application that is executable at the UE 101, such as location-based service applications, navigation applications, mapping application, GIS applications, sensor monitoring applications, calendar applications, content provisioning services, camera/imaging application, media player applications, social networking applications, and the like. In one embodiment, one of the applications 103 at the UE 101 may act as a client for the identification platform 109 and may perform one or more functions associated with the functions of the identification platform 109 by interacting with the identification platform 109 over the communication network 107.

The system 100 comprises of sensors 105a-105n (hereinafter sensors 105). By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication, etc.), temporal information sensor, a camera/imaging sensor for gathering image data, an audio recorder for gathering audio data, and the like. In one scenario, the sensors 105 may include, light sensors, orientation sensors augmented with height sensing and acceleration sensing, tilt sensors to detect the degree of incline or decline of the vehicle along a path of travel, moisture sensors, pressure sensors, etc. In one example embodiment, the UE 101 may include GPS receivers to obtain geographic coordinates from satellites 119 for determining current location and time associated with at least one UE 101. In another example embodiment, the sensors 105 is a Light Detection and Ranging (LIDAR) device or sensor, a laser device, and/or other device that collects data points, such as three dimensional data, by transmitting and receiving light. For example, the LIDAR sensors use one or more lasers to collect data points representing on-ground objects in a surrounding area. The LIDAR sensors collects and gathers data points in a point cloud, such as a three dimensional point cloud, in which each data point corresponds to a local coordinate, such as (x, y, z). In one scenario, LIDAR sensors not only collect street level (i.e., outdoor) three dimensional point clouds but also indoor three dimensional point clouds. The indoor LIDAR data can significantly assist in determining POIs.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The system 100 comprises of the identification platform 109. In one embodiment, the identification platform 109 may be a platform with multiple interconnected components. The identification platform 109 may include multiple servers, intelligent networking devices, computing devices, components and corresponding software for detecting POI using a combination of mobile device positioning with three dimensional location data.

In one embodiment, the identification platform 109 may cause, at least in part, a detection of location information associated with at least one geographic region of interest via mobile device positioning mechanisms, light detection and ranging mechanisms, or a combination thereof. The identification platform 109 may process the location information associated with a plurality of devices to determine one or more location points at which there are one or more concentrations of the plurality of devices. Then, the identification platform 109 may access the three-dimensional data representing the one or more location points. In one scenario, one or more UE 101 may gather in a particular location for certain duration to perform any general activities. The identification platform 109 may determine a confidence measure based on the activity information. Subsequently, a presence of POI is determined based on the confidence measure. In one example embodiment, plurality of users is present in location ABC to withdraw money. The identification platform 109 detects an ATM machine outside a building in location ABC. The confidence measure that the building is more likely to be a bank may be bolstered by the user activity of withdrawing money.

In one embodiment, the identification platform 109 may process the three-dimensional data to determine one or more features that are indicative of a presence of one or more POIs. In one example embodiment, the identification platform 109 may process location information associated with one or more mobile devices, one or more vehicles, or a combination thereof to determine one or more stationary points, one or more contextually relevant points, or a combination thereof.

In one embodiment, the identification platform 109 may process and/or facilitate a processing of one or more stationary points, one or more contextually relevant points, or a combination thereof to determine a candidate POI. In one example embodiment, the identification platform 109 may determine a confidence measure indicating the presence of at least one candidate POI. The confidence measure may include pre-determined time threshold, presence of an awning over an entrance, or a combination thereof.

In one embodiment, the identification platform 109 may include or have access to geographic database 111 to access or store any kind of data, such as one or more stationary points, one or more contextually relevant points, location proximity information, temporal information, contextual information, historical user information etc. Data stored in the geographic database 111 may, for instance, be provided by the UE 101, the sensors 105, the services platform 113, one or more services 115a-115n (or services 115), or one or more content providers 117a-117n (or content providers 117.

The services platform 113 may include any type of service. By way of example, the services platform 113 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the identification platform 109 and the content providers 117 to supplement or aid in the processing of the content information (e.g., location information).

In one embodiment, the services 115 may be an online service that reflects interests and/or activities of users. In one scenario, the services 115 provide representations of each user (e.g., a profile), his/her social links, and a variety of additional information. The services 115 allow users to share location information, navigation related information, activities information, contextual information, historical user information and interests within their individual networks, and provides for data portability.

The content providers 117 may provide content to the UE 101, the identification platform 109, and the services 115 of the services platform 113. The content provided may be any type of content, such as textual content, image content, video content etc. In one embodiment, the content providers 117 may provide content that may supplement content of the applications 103, sensors 105, or a combination thereof. By way of example, the content providers 117 may provide content that may aid in the processing of the location information to determine new POI. In another embodiment, the content providers 117 may also store content associated with the UE 101, the identification platform 109, and the services 115 of the services platform 113. In a further embodiment, the content providers 117 may manage access to a central repository of data, and offer a consistent, standard interface to data.

By way of example, the UE 101, the identification platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collects geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 2:
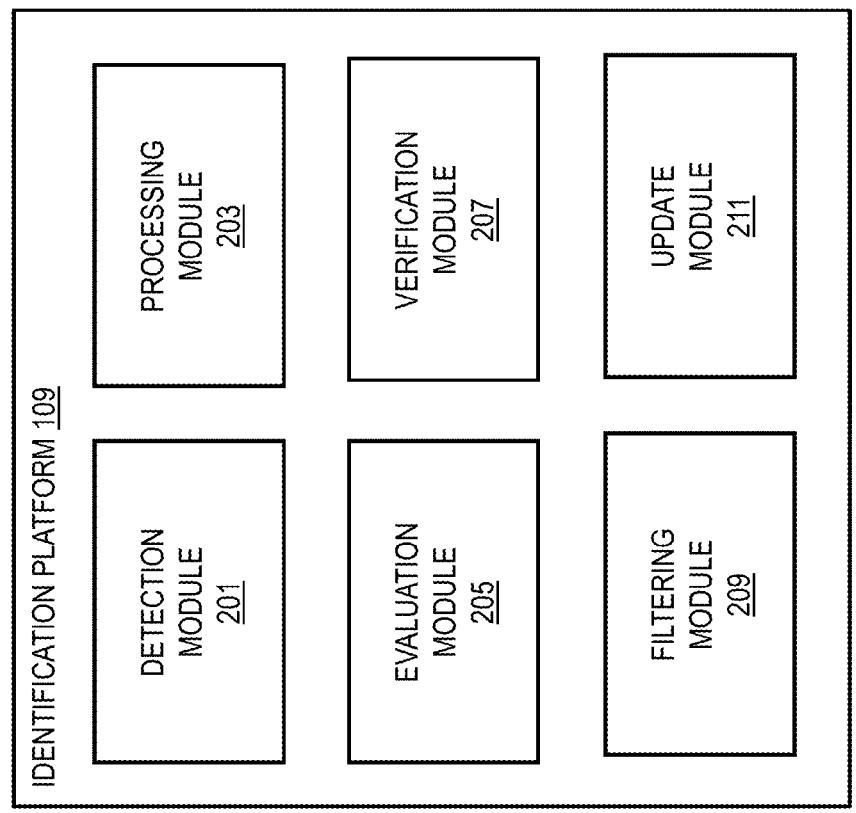
FIG. 2 is a diagram of the components of identification platform 109, according to one embodiment.

FIG. 2 is a diagram of the components of the identification platform 109, according to one embodiment. By way of example, the identification platform 109 includes one or more components for detecting POIs using a combination of mobile device positioning with three dimensional location data. In this embodiment, the identification platform 109 includes a detection module 201, a processing module 203, an evaluation module 205, a verification module 207, a filtering module 209, and an update module 211. It is contemplated that the functions of these components may be combined in one or more components or performed by other components of equivalent functionality.

In one embodiment, the detection module 201 may detect location information associated with at least one geographic region of interest via mobile device positioning mechanisms, LIDAR mechanisms, or a combination thereof. In one example embodiment, the detection module 201 may process position data for one or more mobile devices, one or more vehicles, or a combination thereof. Then, the detection module 201 may identify one or more candidate POIs based, at least in part, on stationary position of one or more mobile devices, one or more vehicles, or a combination thereof. In one scenario, the position data includes probe data. In another embodiment, the detection module 201 may collect, register, geo-index, or a combination thereof of one or more location information received via mobile device positioning mechanisms, LIDAR, or a combination thereof.

In one embodiment, the processing module 203 may process the location information associated with one or more mobile devices, one or more vehicles, or a combination thereof to determine one or more stationary points, one or more contextually relevant points, or a combination thereof. Then, the processing module 203 may process one or more stationary points, one or more contextually relevant points, or a combination thereof to determine a candidate POI.

In one embodiment, the evaluation module 205 may determine confidence measure indicating the presence of at least one candidate POI. In one scenario, the confidence measure may include pre-determined time threshold, presence of an awning over an entrance, or a combination thereof. In one example embodiment, the evaluation module 205 may identify a candidate POI based, at least in part, on pre-determined time threshold one or more mobile devices, one or more vehicles, or a combination thereof remains stationary in at least one candidate POI. In another embodiment, the evaluation module 205 may determine location information, one or more POIs, one or more location-based events, or a combination thereof in real-time, periodically, according to schedule, on demand, or a combination thereof. In one example embodiment, the evaluation module 205 may determine one or more location-based events (e.g., user activities) based, at least in part, on pre-determined time threshold. Further, the evaluation module 205 may determine a candidate POI based, at least in part, on return of one or more mobile devices, one or more vehicles, or a combination thereof to at least one POI for certain time-periods for performing any types of functional purposes, for example, buying groceries, eating a meal, etc.

In one embodiment, the verification module 207 may authenticate one or more items in the POI candidate list. Then, the verification module 207 may store one or more candidate items in at least one data store based, at least in part, on the authentication. In another embodiment, the verification module 207 may collect list of geographic positions including significant POIs. Then, the verification module 207 may access corresponding LIDAR data in similar geographical area for each significant POIs.

In one embodiment, the filtering module 209 may cause a comparison of the at least one POI with other POIs. Then, the filtering module 209 may determine the at least one POI is not previously included in at least one candidate list. Subsequently, the filtering module 209 may filter the at least one POI to the POI candidate list.

In one embodiment, the update module 211 may update the POI database based, at least in part, on the one or more new candidate POIs. In one example embodiment, the one or more new candidate POIs are locations with convincing LIDAR data, one or more stationary unique users, or a combination thereof. In one scenario, the identification platform 109 may cause a visual representation of POIs on a mapping user interface of the UE 101, to enable a user to identify the POI in real life environment just by looking at the map user interface. By way of example, the user interface element may be displayed as a map that depicts a route with POI embedded therein.

The above presented modules and components of the identification platform 109 can be implemented in hardware, firmware, software, or a combination thereof. Though depicted as a separate entity in FIG. 1A, it is contemplated that the identification platform 109 may be implemented for direct operation by respective UE 101. As such, the identification platform 109 may generate direct signal inputs by way of the operating system of the UE 101 for interacting with the applications 103. In another embodiment, one or more of the modules 201-211 may be implemented for operation by respective UEs, the identification platform 109, or combination thereof. Still further, the identification platform 109 may be integrated for direct operation with services 115, such as in the form of a widget or applet, in accordance with an information and/or subscriber sharing arrangement. The various executions presented herein contemplate any and all arrangements and models.

Figure 3:
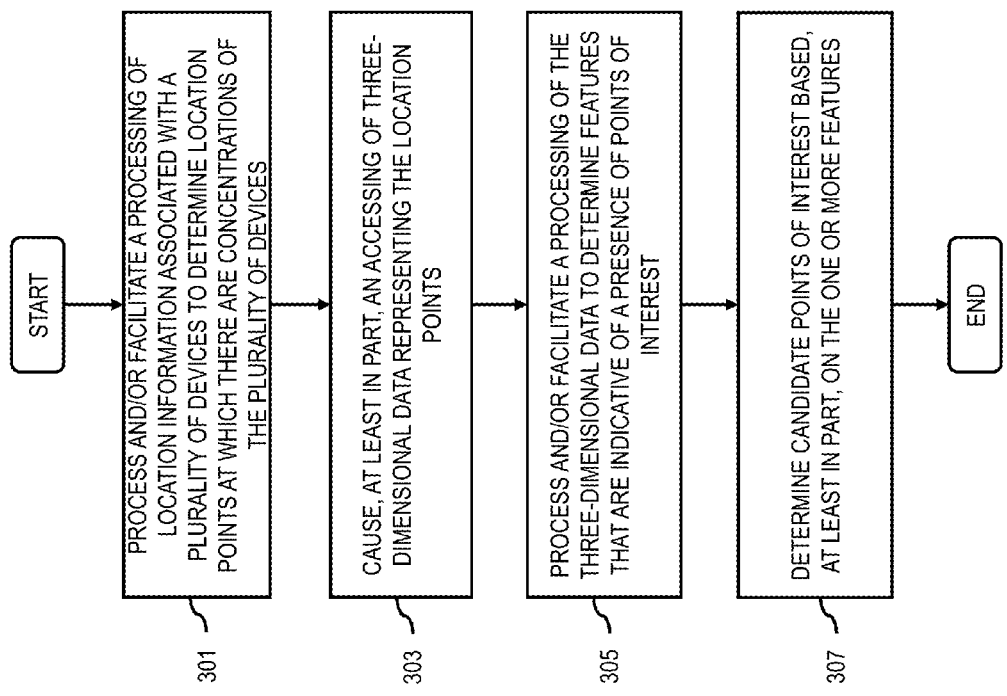
FIG. 3 is a flowchart of a process for determining candidate POI based, at least in part, on three-dimensional data representing the one or more location points with plurality of devices, according to one embodiment.
Figure 10:
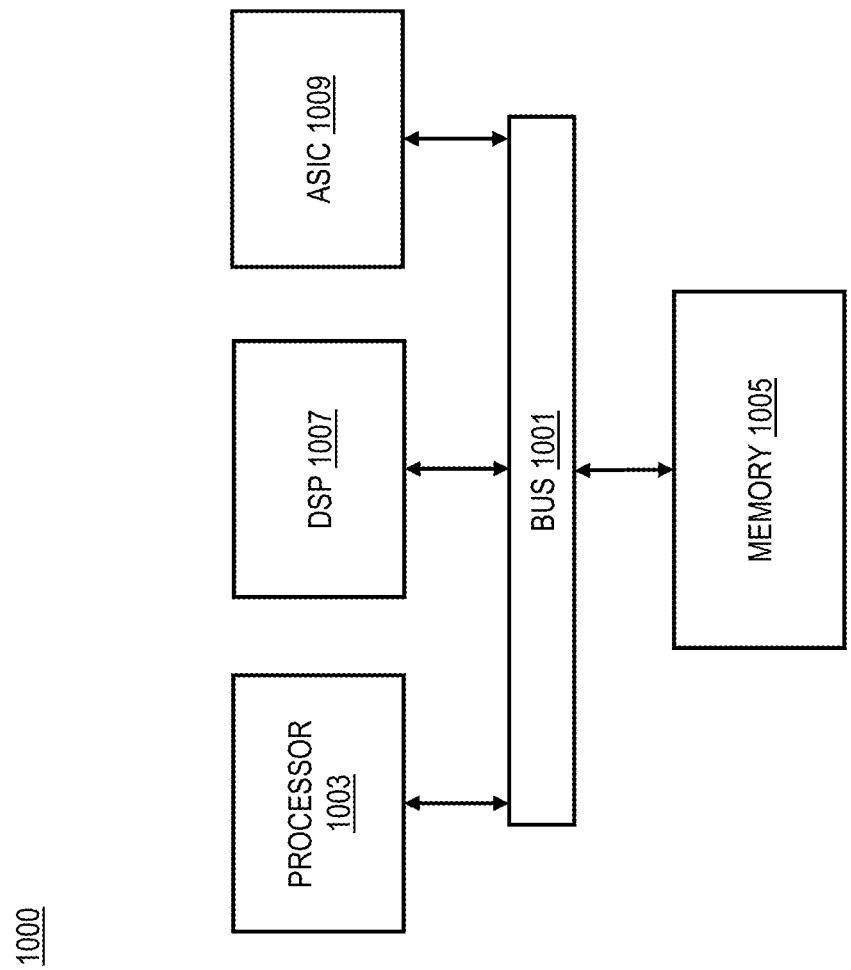
FIG. 10 is a diagram of a chip set that can be used to implement an embodiment of the invention.

FIG. 3 is a flowchart of a process for determining candidate POI based, at least in part, on three-dimensional data representing the one or more location points with plurality of devices, according to one embodiment. In one embodiment, the identification platform 109 performs the process 300 and is implemented in, for instance, a chip set including a processor and a memory as shown in FIG. 10.

In step 301, the identification platform 109 may process and/or facilitate a processing of location information associated with a plurality of devices to determine one or more location points at which there are one or more concentrations of the plurality of devices. In one scenario, the identification platform 109 may receive location data from one or more sensors associated with one or more mobile devices. The gathering of one or more mobile devices in a particular geographic region may designate the geographic region for processing. The identification platform 109 may process the geographic region to determine a new POI, access the corresponding three-dimensional data, or a combination thereof.

In step 303, the identification platform 109 may cause, at least in part, an accessing of three-dimensional data representing the one or more location points. In one embodiment, the three-dimensional data include, at least in part, LIDAR data, three-dimensional modeling data, or a combination thereof. In one scenario, the LIDAR sensors may transmits laser beams toward a target while moving through specific survey routes. The reflection of the laser from the target is detected and analyzed by receivers in the LIDAR sensors. These receivers record the precise time from when the laser pulse left the system to when it is returned to calculate the range distance between the sensor and the target. Further, the LIDAR sensors may combine the positional information (e.g., GPS) with distance measurements, wherein the measurements are transformed to actual three-dimensional points of the reflective target in object space. The LIDAR sensors may analyze the laser time range, laser scan angle, GPS position to generate a highly accurate geo-referenced x, y, z coordinates.

In step 305, the identification platform 109 may process and/or facilitate a processing of the three-dimensional data to determine one or more features that are indicative of a presence of one or more points of interest. In one scenario, the laser beams emitted from a LIDAR sensor is capable of detecting features for one or more structures, for example, elevation, presence of an awning over an entrance, building outlines, etc.

In step 307, the identification platform 109 may determine one or more candidate points of interest based, at least in part, on the one or more features. In one scenario, the recognition of various shapes, terrains, etc. via LIDAR sensors assists the identification platform 109 to determine one or more features that are indicative of a presence of a POI. In one example embodiment, the LIDAR sensors may detect an awning over an entrance in the geographic region with concentrations of plurality of devices. Then, the identification platform 109 may determine an existence of a POI based on such detection.

Figure 4:
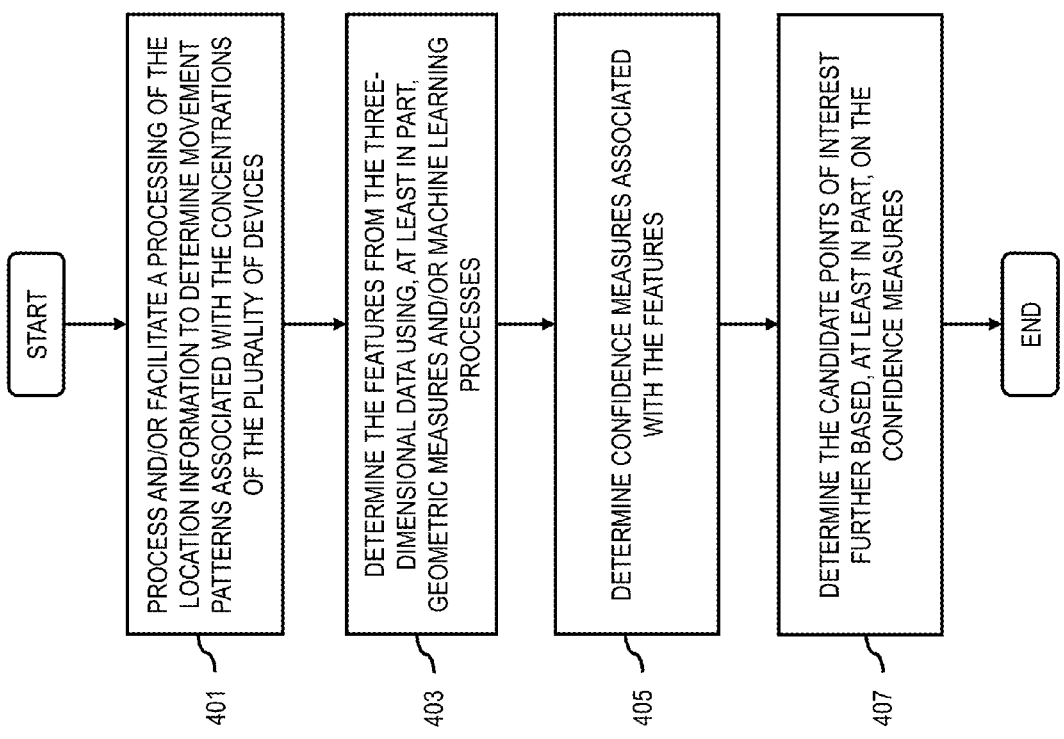
FIG. 4 is a flowchart of a process for determining candidate POI based, at least in part, on the confidence measures associated with the features from the three-dimensional data, according to one embodiment.

FIG. 4 is a flowchart of a process for determining candidate POI based, at least in part, on the confidence measures associated with the features from the three-dimensional data, according to one embodiment. In one embodiment, the identification platform 109 performs the process 400 and is implemented in, for instance, a chip set including a processor and a memory as shown in FIG. 10.

In step 401, the identification platform 109 may process and/or facilitate a processing of the location information to determine one or more movement patterns associated with the one or more concentrations of the plurality of devices. In one embodiment, the one or more movement patterns are indicative of the presence of the one or more points of interest. In another embodiment, the one or more movement patterns include, at least in part, a stationary pattern, a pattern associated with one or more functional purposes, or a combination thereof. In a further embodiment, the one or more functional purposes are indicative of the presence of the one or more points of interest including, at least in part, an eating of a meal, a performing of a shopping activity, or a combination thereof.

In step 403, the identification platform 109 may determine the one or more features from the three-dimensional data using, at least in part, one or more geometric measures, one or more machine learning processes, or a combination thereof. In one scenario, the geometric characteristics of a building (e.g., size, height, shape, texture etc.) may be used to separate buildings from other objects, for example, a building may be separated from a tree based on surface roughness. In another scenario, the identification platform 109 may implement its machine learning capability, wherein the system may detect via sensors 105 features that indicates the presence of POI. In one example embodiment, to distinguish between POIs, the identification platform 109 may further analyze LIDAR data. In one scenario, to determine whether POI is a bank or a restaurant, the identification platform 109 may analyze LIDAR data to determine building features, for example, outdoor ATM machines, drive-through with menus vs. drive-through with machines and teller windows, three dimensional logos, etc.

In step 405, the identification platform 109 may determine one or more confidence measures associated with the one or more features. In one scenario, the confidence measure is based on the likelihood that one or more features indicating the presence of at least on POI has been identified. In another scenario, the confidence measure may include pre-determined time threshold, for example, the duration one or more mobile devices remained stationary in a location point. In a further scenario, the confidence measure may include any features of a building or a surface (e.g., presence of an awning over an entrance) that gives an indication of the presence of POI.

In step 407, the identification platform 109 may determine the one or more candidate points of interest further based, at least in part, on the one or more confidence measures. In one scenario, dual data analysis may be implemented to work around a building feature with low confidence measure. The errors or low confidence measure on either the stay point or the LIDAR analysis may be addressed by the other. In one example embodiment, the identification platform 109 detects an ATM machine in a building, but confidence measure is very low. This low confidence measure may be bolstered by the stay point analysis with strong labeling that the building is more likely to be a bank than a fast food restaurant.

Figure 5:
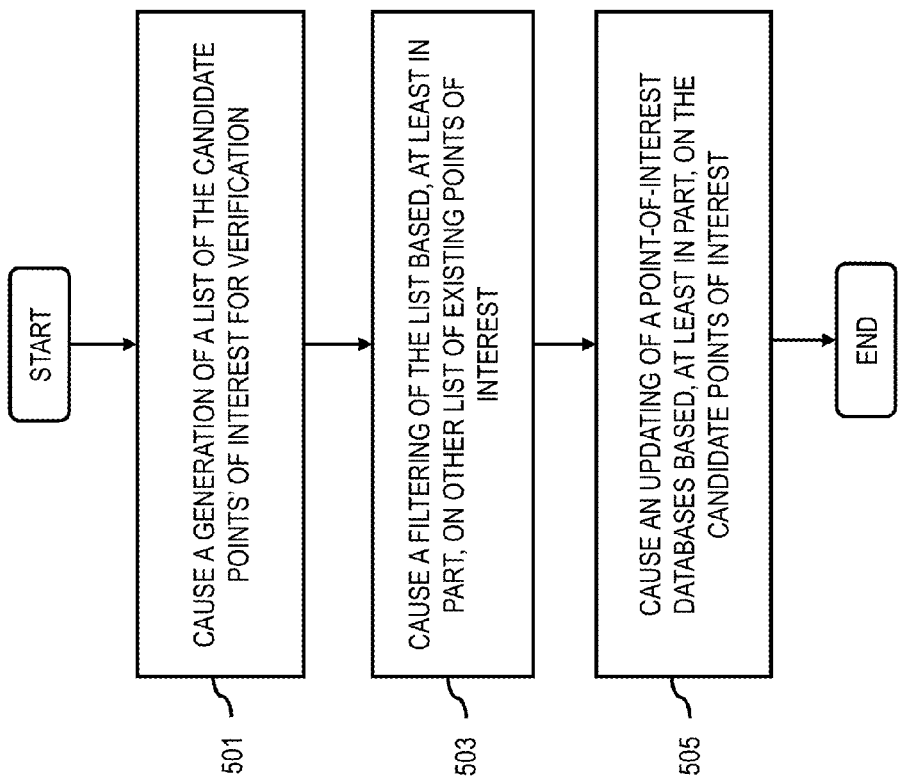
FIG. 5 is a flowchart of a process for causing a comparison between a newly generated list of candidate POI with the list of one or more existing POIs to cause an updating of the POI databases, according to one embodiment.

FIG. 5 is a flowchart of a process for causing a comparison between a newly generated list of candidate POIs with the list of one or more existing POIs to cause an updating of the POI databases, according to one embodiment. In one embodiment, the identification platform 109 performs the process 500 and is implemented in, for instance, a chip set including a processor and a memory as shown in FIG. 10.

In step 501, the identification platform 109 may cause, at least in part, a generation of at least one list of the one or more candidate points' of interest for verification. In one scenario, the identification platform 109 may authenticate one or more items in the newly generated POI candidate list. The identification platform 109 may cause a comparison of one or more items in the newly generated POI candidate list with existing POI list.

In step 503, the identification platform 109 may cause, at least in part, a filtering of the at least one list based, at least in part, on at least one other list of one or more existing points of interest. In one scenario, the identification platform 109 may determine whether one or more POIs in the newly generated candidate list are already included in the existing POI list. Then, the identification platform 109 may remove the already existing POI from the newly generated POI candidate list.

In step 505, the identification platform 109 may cause, at least in part, an updating of one or more point-of-interest databases based, at least in part, on the one or more candidate points of interest. In one scenario, the identification platform 109 may determine location information in real-time, periodically, according to schedule, on demand, or a combination thereof. The identification platform 109 may update the POI database based, at least in part, on the determination.

Figure 6:
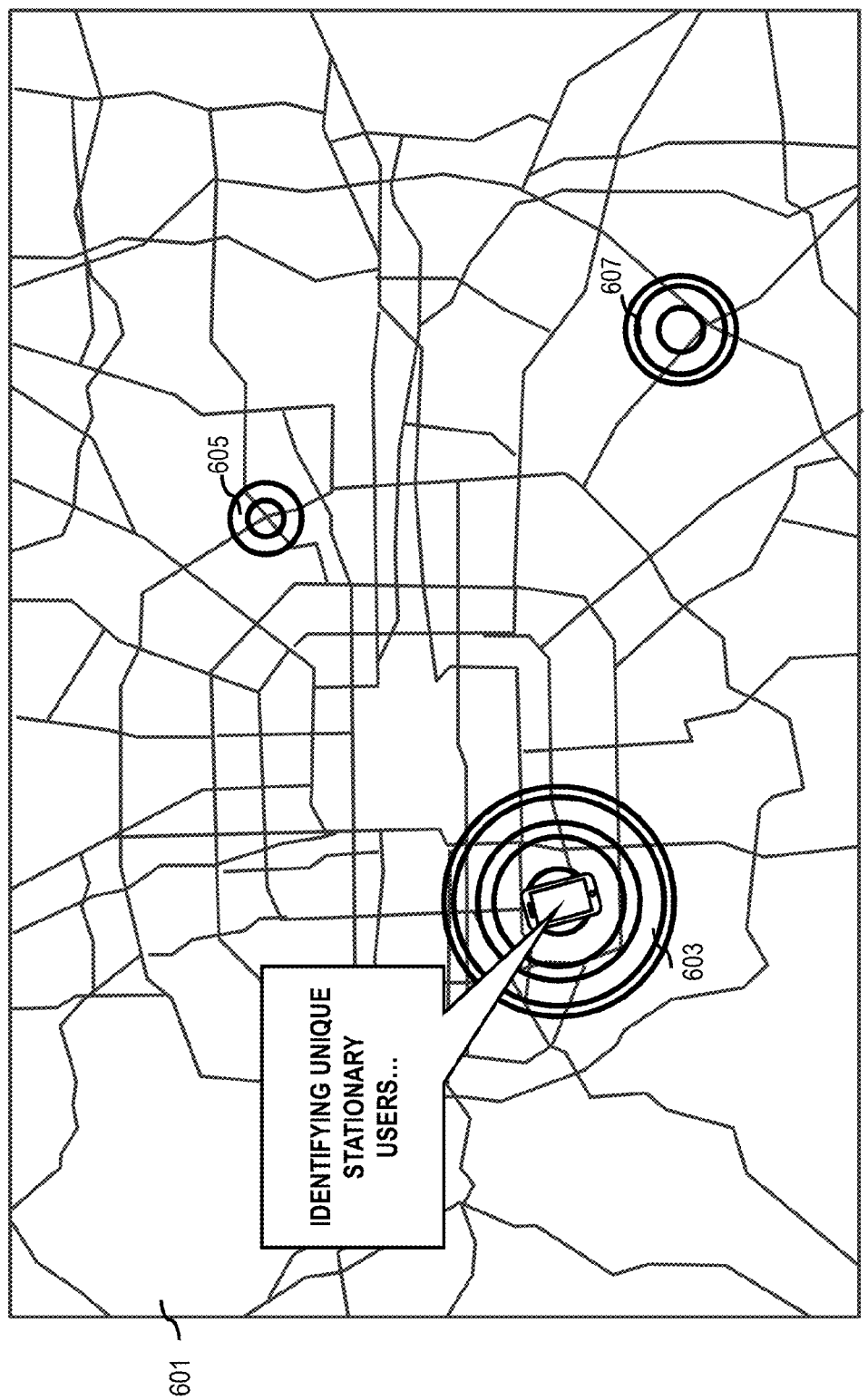
FIG. 6 is a diagram that represents a scenario wherein the identification platform 109 identifies stationary positions in various geographic regions, according to one example embodiment.

FIG. 6 is a diagram that represents a scenario wherein the identification platform 109 identifies stationary positions in various geographic regions, according to one example embodiment. In one scenario, one or more sensors associated with a mobile device, a vehicle, or a combination thereof may emit location information 601. The location information may be processed to identify geographical regions with large numbers of unique stationary users. In one scenario, the identification platform 109 may receive data from one or more sensors that over seven users are in a stationary position at the geographic region 603, two users are in a stationary position at the geographic region 605, and three users are in a stationary position at the geographic region 607. Then, the identification platform 109 may analyze the mobile device position data (i.e. probe data) to determine areas where unique mobile devices remained stationary or returned to for periods of time that were relevant to specific functional purposes, for example, eating a meal etc. The identification platform 109 may identify these points as "significant location points."

Figure 7:
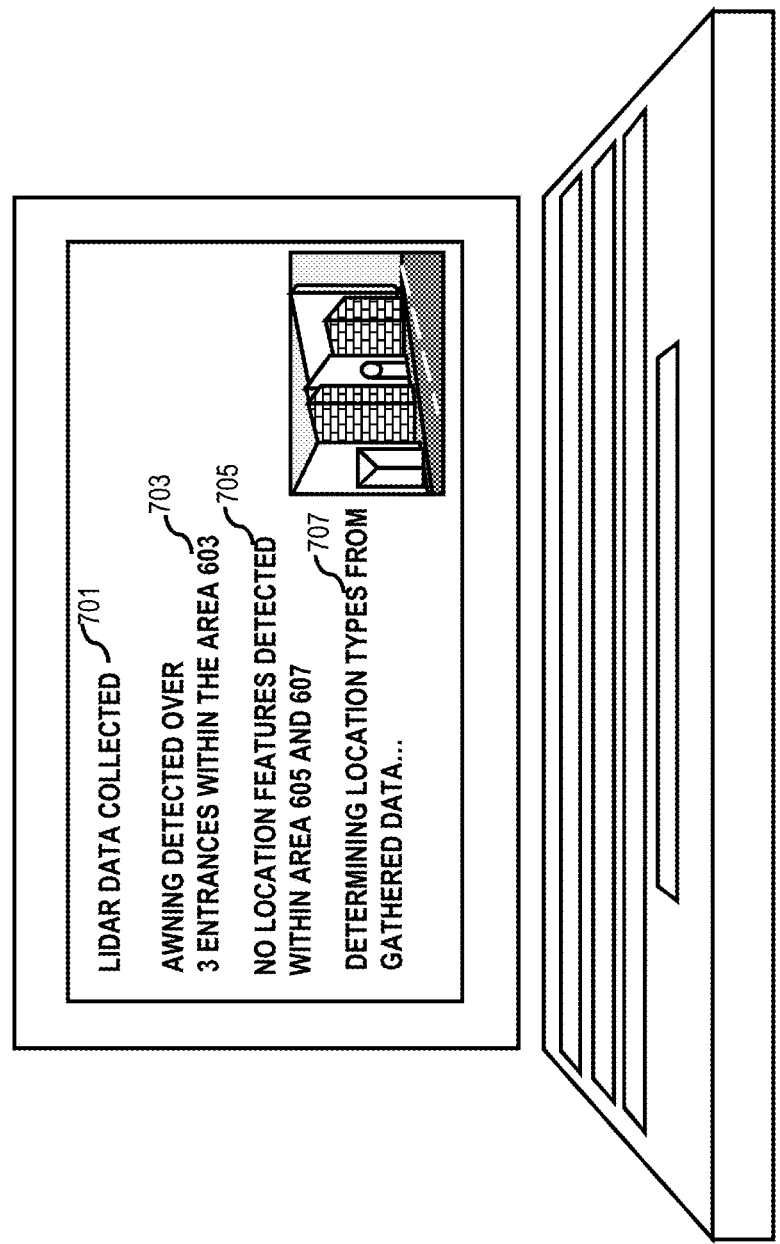
FIG. 7 is a diagram that represents a scenario wherein the identification platform 109 collects LIDAR data representing geographic regions with concentrations of mobile devices in a stationary position, according to one example embodiment.

FIG. 7 is a diagram that represents a scenario wherein the identification platform 109 collects LIDAR data representing geographic regions with concentrations of mobile devices in a stationary position, according to one example embodiment. In one scenario, the identification platform 109 may collect LIDAR data pertaining to geographic regions with concentrations of mobile devices 701. Then, the identification platform 109 may process the LIDAR data to find features that may indicate the presence of POIs. These features may include confidence measurements indicating the presence of an awning over an entrance 703. The locations with strong LIDAR features and many unique stationary users are POI candidates. On the other hand, location with no LIDAR features 705 may be disregarded. Then, the identification platform 109 may determine location types from the gathered data 707.

Figure 8:
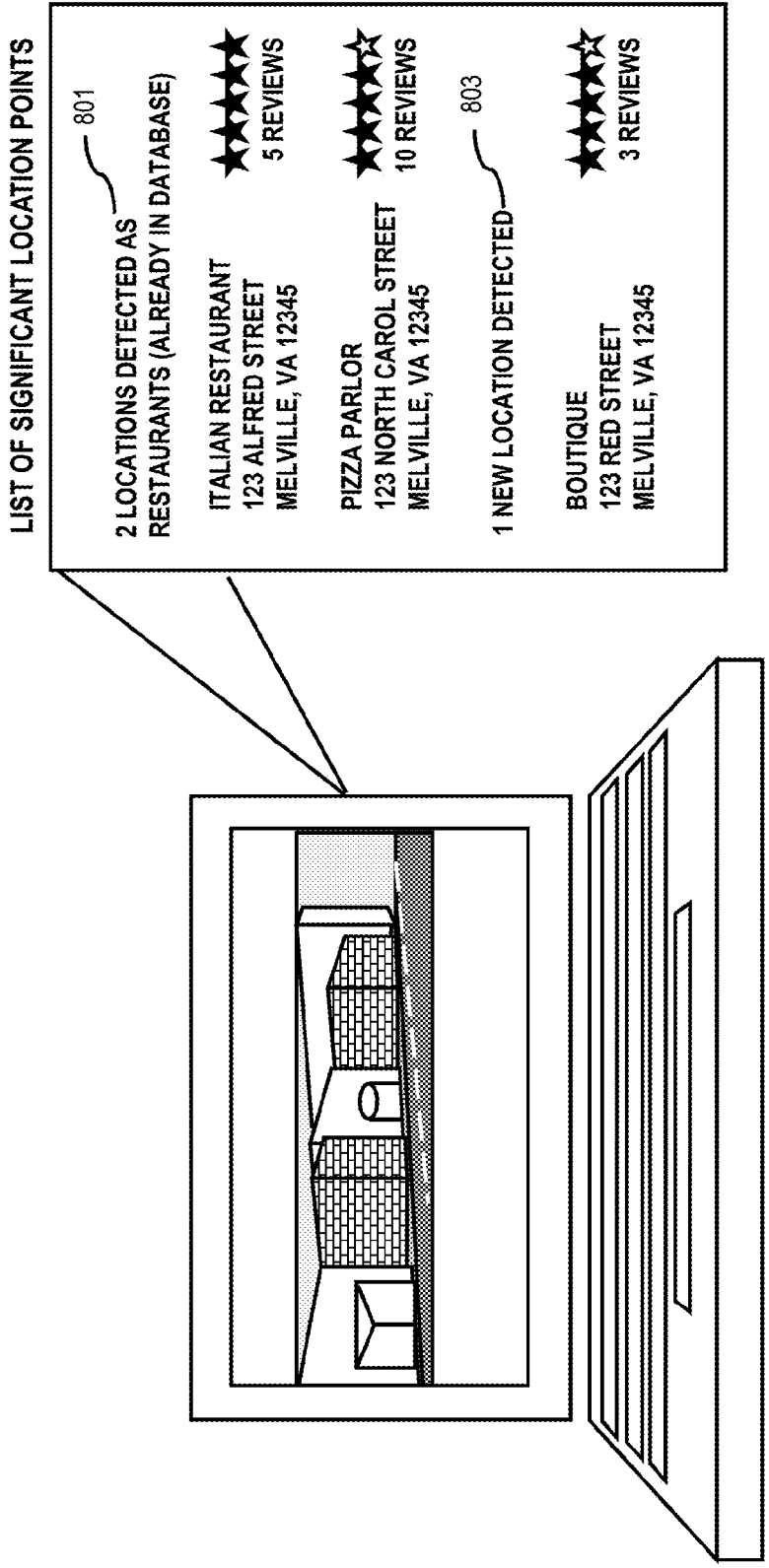
FIG. 8 is a diagram that represents a scenario wherein the identification platform 109 filters one or more POI candidates, according to one example embodiment.

FIG. 8 is a diagram that represents a scenario wherein the identification platform 109 filters one or more POI candidates, according to one example embodiment. As discussed, the identification platform 109 may access corresponding LIDAR data for geographic regions with concentration of mobile devices. Then, the identification platform 109 may process LIDAR data to determine features for the geographic region. The identification platform 109 may implement techniques involving but not limited to geometric measures and machine learning. This processing yields a set of confidence measures relevant to determining the presence of POI. Subsequently, the identification platform 109 may determine the presence of one or more POI in the POI database 801, 803. The identification platform may filter the one or more POIs to include POI that are missing from the POI database 801.

The processes described herein for detecting POIs using a combination of mobile device positioning with three dimensional location data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
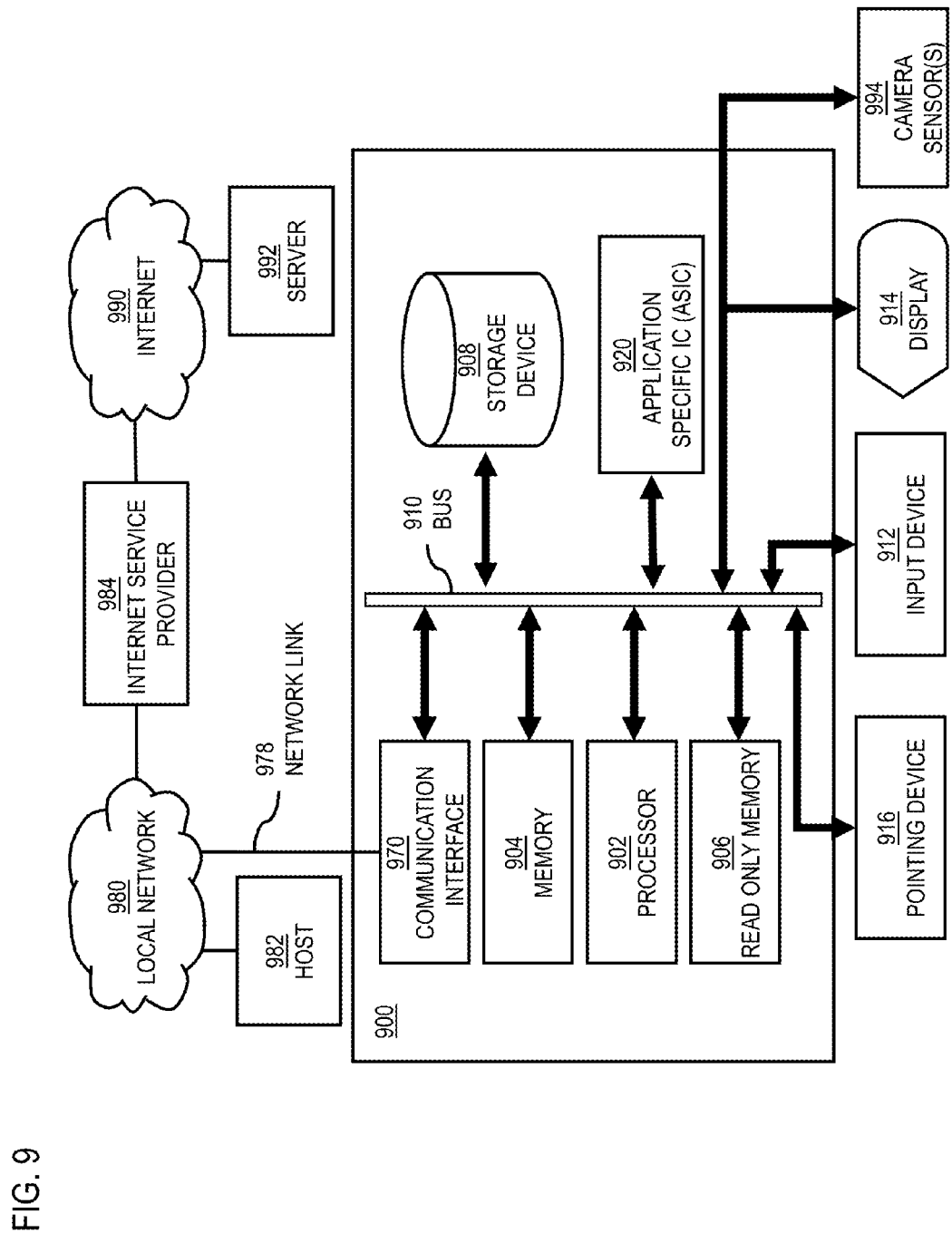
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to detect POIs using a combination of mobile device positioning with three dimensional location data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of detecting POIs using a combination of mobile device positioning with three dimensional location data.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to detect POIs using a combination of mobile device positioning with three dimensional location data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for detecting POIs using a combination of mobile device positioning with three dimensional location data. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for detecting POIs using a combination of mobile device positioning with three dimensional location data, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for detecting POIs using a combination of mobile device positioning with three dimensional location data to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to detect POIs using a combination of mobile device positioning with three dimensional location data as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of detecting POIs using a combination of mobile device positioning with three dimensional location data.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to detect POIs using a combination of mobile device positioning with three dimensional location data. The memory 1005 also stores the data associated with or generated by the execution of the inventive steps.

Figure 11:
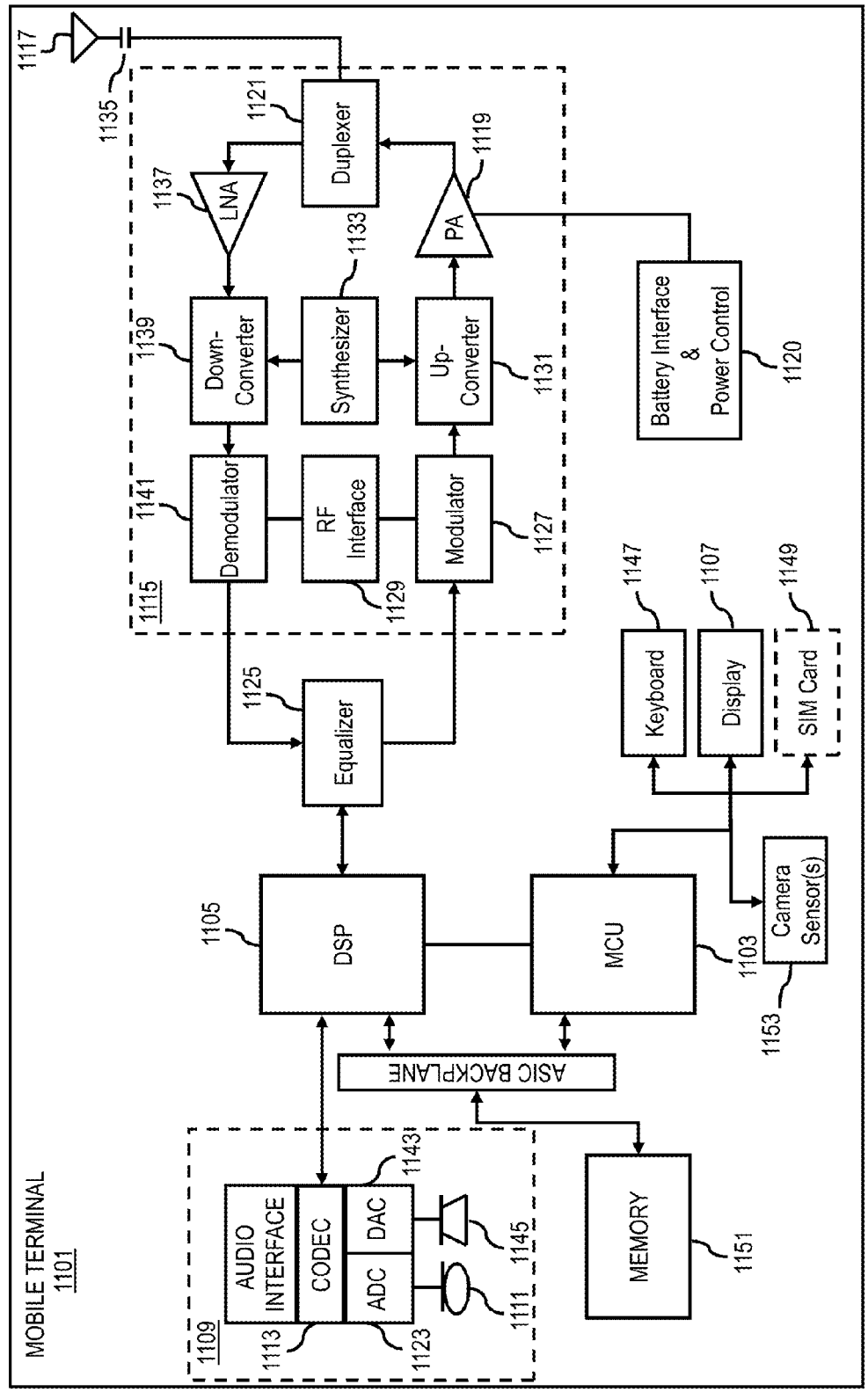
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1A, according to one embodiment. In some embodiments, mobile terminal 1101, or a portion thereof, constitutes a means for performing one or more steps of detecting POIs using a combination of mobile device positioning with three dimensional location data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of detecting POIs using a combination of mobile device positioning with three dimensional location data. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to detect POIs using a combination of mobile device positioning with three dimensional location data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be used.

What is claimed is:

1. A method for detecting a point of interest, the method comprising:
    receiving location information associated with a first plurality of mobile devices in a geographic region;
    determining a concentration of mobile devices from among the first plurality based on identifying a second plurality of mobile devices associated with the concentration,
        wherein the first plurality of mobile devices includes the second plurality of mobile devices and additional mobile devices not in the determined concentration,
        wherein the second plurality is based on mobile devices that are identified as stationary and/or located within the geographic region for a specified period of time;
    processing select location information associated with the second plurality of mobile devices to determine one or more fixed location points in the geographic region which points include the determined concentration of mobile devices;
    collecting three-dimensional data obtained using a Light Detection and Ranging (LIDAR) detector by transmitting laser beams in a survey zone,
        wherein the collected three dimensional data include data representing a plurality of features in the survey zone;
    accessing the three-dimensional data representing the one or more determined fixed location points as coinciding with the survey zone from a geographic database comprising the collected three-dimensional data;
    processing the accessed three-dimensional data to determine one or more features from the plurality of features in the survey zone and associated with the one or more fixed location points,
        wherein the determined one or more features are indicative of a presence of one or more candidate points of interest in the geographic region; and
    determining the one or more candidate points of interest based, at least in part, on the determined one or more features.

2. The method of claim 1, comprising:
    determining one or more actual points of interest based on an analysis of the one or more candidate points of interest,
        wherein the first plurality of mobile devices is based on mobile devices that are identified as stationary,
        wherein the three-dimensional data include, at least in part, the data obtained using the LIDAR detector, three-dimensional modeling data, or a combination thereof,
        wherein the determining the one or more candidate points of interest is further based, at least in part, on the one or more fixed location points, the determined concentration, the second plurality of mobile devices, or a combination thereof.

3. The method of claim 1, comprising:
    processing the location information to determine one or more movement patterns associated with the concentration of the plurality of mobile devices,
        wherein the one or more movement patterns are indicative of the presence of the one or more candidate points of interest.

4. The method of claim 3, wherein the one or more movement patterns include, at least in part, a stationary pattern, a pattern associated with one or more functional purposes, or a combination thereof.

5. The method of claim 4, wherein the one or more functional purposes are indicative of the presence of the one or more candidate points of interest including, at least in part, an eating of a meal, a performing of a shopping activity, or a combination thereof.

6. The method of claim 1, comprising:
    determining the one or more features from the three-dimensional data using one or more geometric measures, one or more machine learning processes, or a combination thereof.

7. The method of claim 1, comprising:
determining one or more confidence measures associated with the one or more features; and
determining the one or more candidate points of interest further based, at least in part, on the one or more confidence measures.

8. The method of claim 1, comprising:
generating a list of the one or more candidate points of interest for verification.

9. The method of claim 8, comprising:
filtering the list based on at least one other list of one or more existing points of interest.

10. The method of claim 1, comprising:
updating one or more point-of-interest databases based on the one or more candidate points of interest.

11. An apparatus for detecting a point of interest, the apparatus comprising:
a processor; and
a memory including computer program code for one or more programs,
the memory and the computer program code configured to:
receive location information associated with a first plurality of mobile devices in a geographic region,
determine a concentration of mobile devices from among the first plurality based on identifying a second plurality of mobile devices associated with the concentration,
wherein the first plurality of mobile devices includes the second plurality of mobile devices and additional mobile devices not in the determined concentration,
wherein the second plurality is based on mobile devices that are identified as stationary and/or located within the geographic region for a specified period of time,
process select location information associated with the second plurality of mobile devices to determine one or more fixed location points in the geographic region which points include the determined concentration of mobile devices,
collect three-dimensional data obtained using a Light Detection and Ranging (LIDAR) detector by transmitting laser beams in a survey zone,
wherein the collected three-dimensional data include data representing a plurality of features in the survey zone,
access the three-dimensional data representing the one or more determined fixed location points as coinciding with the survey zone from a geographic database comprising the collected three-dimensional data,
process the accessed three-dimensional data to determine one or more features from the plurality of features in the survey zone and associated with the one or more fixed location points,
wherein the determined one or more features are indicative of a presence of one or more candidate points of interest in the geographic region, and
determine one or more candidate points of interest based, at least in part, on the determined one or more features.

12. The apparatus of claim 11, wherein the apparatus is further configured to:
determine one or more actual points of interest based on an analysis of the one or more candidate points of interest,
wherein the first plurality of mobile devices is based on mobile devices that are identified as stationary,
wherein the three-dimensional data include the data obtained using the LIDAR detector, three-dimensional modeling data, or a combination thereof,
wherein the determining the one or more candidate points of interest is further based, at least in part, on the one or more fixed location points, the determined concentration, the second plurality of mobile devices, or a combination thereof.

13. The apparatus of claim 11, wherein the apparatus is further configured to:
process the location information to determine one or more movement patterns associated with the concentration of the plurality of devices,
wherein the one or more movement patterns are indicative of the presence of the one or more candidate points of interest.

14. The apparatus of claim 13, wherein the one or more movement patterns include a stationary pattern, a pattern associated with one or more functional purposes, or a combination thereof.

15. The apparatus of claim 14, wherein the one or more functional purposes are indicative of the presence of the one or more candidate points of interest including, at least in part, an eating of a meal, a performing of a shopping activity, or a combination thereof.

16. The apparatus of claim 11, wherein the apparatus is further configured to:
determine the one or more features from the three-dimensional data using, at least in part, one or more geometric measures, one or more machine learning processes, or a combination thereof.

17. The apparatus of claim 11, wherein the apparatus is further configured to:
determine one or more confidence measures associated with the one or more features, and
determine the one or more candidate points of interest further based, at least in part, on the one or more confidence measures.

18. A non-transitory computer-readable storage medium carrying one or more sequences of one or more instructions which, when executed by one or more processors, cause an apparatus to at least perform the following steps:
receive location information associated with a first plurality of mobile devices in a geographic region;
determine a concentration of mobile devices from among the first plurality based on identifying a second plurality of mobile devices associated with the concentration,
wherein the first plurality of mobile devices includes the second plurality of mobile devices and additional mobile devices not in the determined concentration,
wherein the second plurality is based on mobile devices that are identified as stationary and/or located within the geographic region for a specified period of time;
process select location information associated with the second plurality of mobile devices to determine one or more fixed location points in the geographic region which points include the determined concentration of mobile devices;
collect three-dimensional data obtained using a Light Detection and Ranging (LIDAR) detector by transmitting laser beams in a survey zone,
wherein the collected three-dimensional data include data representing a plurality of features in the survey zone;

access the three-dimensional data representing the one or more determined fixed location points as coinciding with the survey zone from a geographic database comprising the collected three-dimensional data;
process the accessed three-dimensional data to determine one or more features from the plurality of features in the survey zone and associated with the one or more fixed location points,
wherein the determined one or more features are indicative of a presence of one or more candidate points of interest in the geographic region; and
determine one or more candidate points of interest based, at least in part, on the determined one or more features.

19. The non-transitory computer readable storage medium of claim 18, wherein the apparatus is further caused to:
determine one or more actual points of interest based on an analysis of the one or more candidate points of interest,
wherein the first plurality of mobile devices is based on mobile devices that are identified as stationary,
wherein the three-dimensional data include the data obtained using the LIDAR detector, three-dimensional modeling data, or a combination thereof,
wherein the determining the one or more candidate points of interest is further based, at least in part, on the one or more location points, the determined concentration, the second plurality of mobile devices, or a combination thereof.

20. The non-transitory computer readable storage medium of claim 18, wherein the apparatus is further caused to:
process the location information to determine one or more movement patterns associated with the concentration of the plurality of mobile devices,
wherein the one or more movement patterns are indicative of the presence of the one or more candidate points of interest.

* * * * *